United States Patent [19]

Davis

[11] 4,109,824
[45] Aug. 29, 1978

[54] PRECISION SEEDER AND METHOD

[75] Inventor: Noel Bryant Davis, Wayzata, Minn.

[73] Assignee: General Mills, Inc., Minneapolis, Minn.

[21] Appl. No.: 719,625

[22] Filed: Sep. 1, 1976

[51] Int. Cl.² .......................................... B65B 57/20
[52] U.S. Cl. ........................................ 221/7; 111/1; 221/96
[58] Field of Search ...................... 221/1, 7, 210, 278, 221/96; 111/1, 8, 34; 209/128, 129, 111.7 R; 239/15

[56] References Cited

U.S. PATENT DOCUMENTS

| | | | |
|---|---|---|---|
| 2,536,693 | 1/1951 | Okolicsanyi | 209/111.7 R |
| 3,249,225 | 5/1966 | Stuetzer | 209/129 |
| 3,291,302 | 12/1966 | Brastad | 209/129 X |
| 3,460,492 | 8/1969 | Dickinson et al. | 111/1 |
| 3,901,184 | 8/1975 | Payne et al. | 239/15 X |
| 3,964,639 | 6/1976 | Norris et al. | 221/278 |

*Primary Examiner*—Stanley H. Tollberg
*Attorney, Agent, or Firm*—G. O. Enockson; L. M. Lillehaugen

[57] ABSTRACT

Individual seeds are electrostatically diverted from a continuously flowing stream of seeds. Each diverted seed is pneumatically conveyed to a seed distributor which sequentially directs each seed it receives to an appropriate delivery tube leading downwardly to a series of laterally spaced dispensers beneath which is positioned a row of fibrous planting blocks. Provision is made for releasing the conveying air just above each dispenser so that for all intents and purposes the seed is gravitationally deposited on its particular planting block. The various planting blocks are arranged in rows on a tray which in turn is carried on a movable transport table. Provision is made for advancing the table row-by-row beneath the various seed dispensers so that all of the blocks in the tray receive seeds.

34 Claims, 8 Drawing Figures

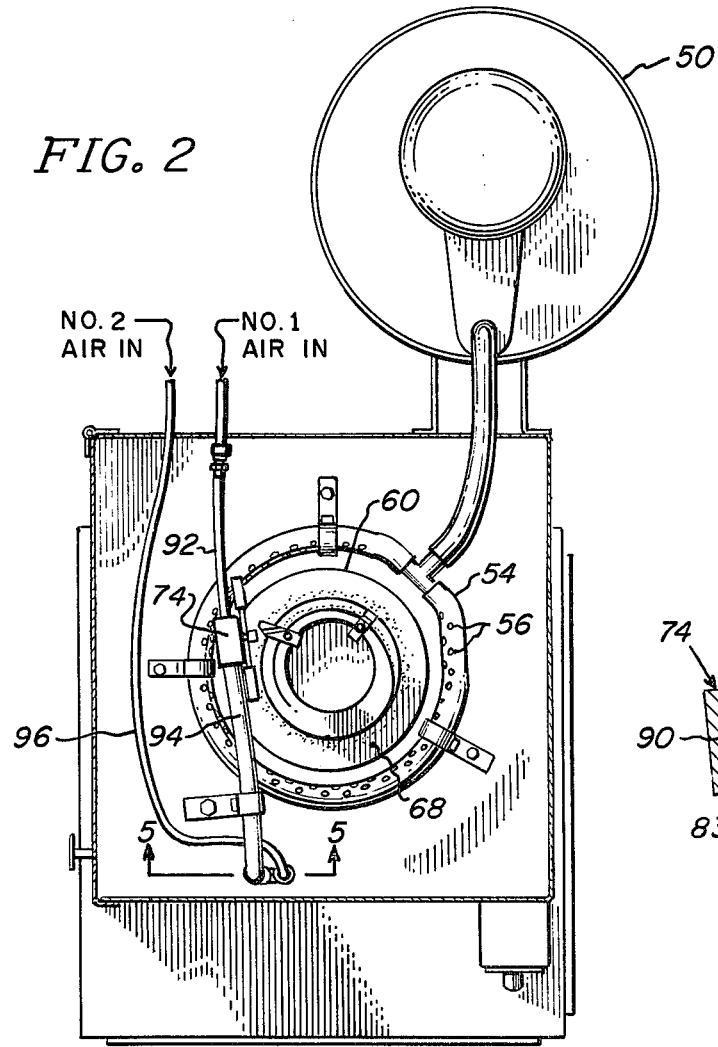
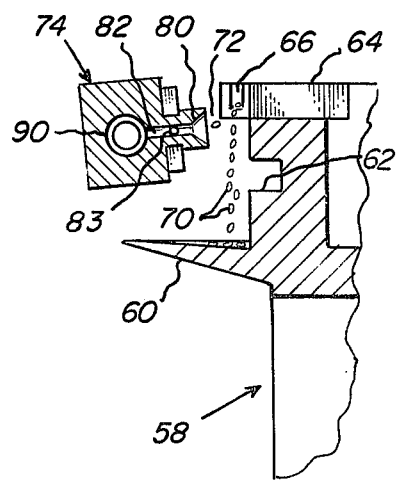
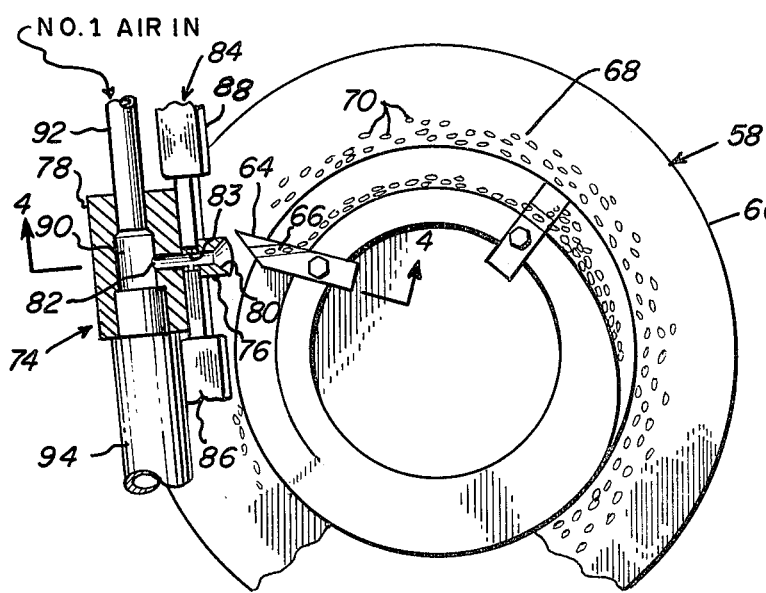

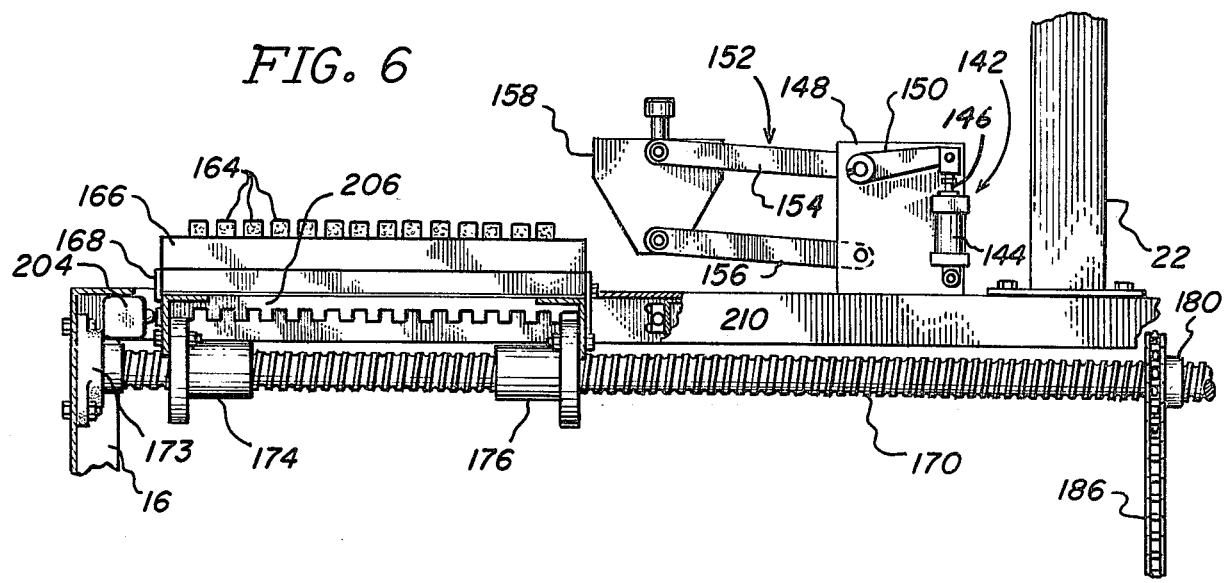
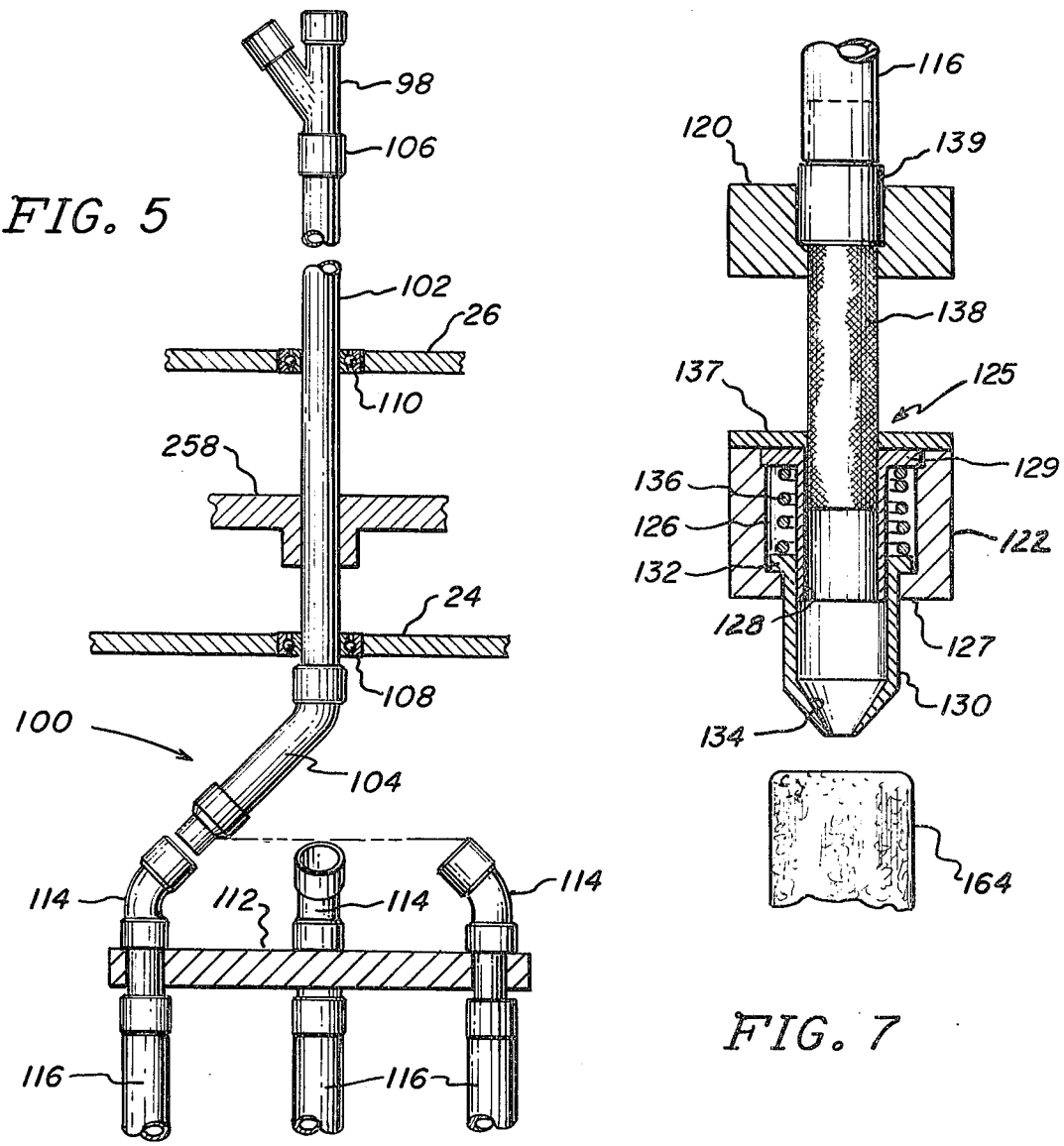

PRECISION SEEDER AND METHOD

BACKGROUND OF THE INVENTION

1. Field of the Invention

This invention relates generally to hydroponics, and pertains more particularly to a method and apparatus for depositing a seed on each of a plurality of planting blocks in preparation for the later hydroponic germination of the seed.

2. Description of the Prior Art

Various factors have entered into the increased popularity of growing plants hydroponically. One benefit is that this type of cultivation lends itself readily to automation, having the capability of reducing the number of man-hours required to grow a given quantity of plant food. Perhaps more important, however, is the advantage of growing certain items, such as lettuce, on an out-of-season basis. Perishable produce can thus be made immediately available during periods that would otherwise require that it be shipped over relatively long distances with an accompanying loss of freshness and/or at considerable expense.

Quite obviously, the seed must be properly "planted" in order for it to germinate in a hydroponic environment. This requires the accurate positioning of single seeds on fibrous planting blocks which are later moved into the cultivating area. Lightweight seed, such as various types of lettuce seeds, have proved to be difficult to handle, especially as far as placing only a single seed at the precise planting point. If more than one seed is planted at one location, the nourishment available per seed is correspondingly reduced with the concomitant likelihood that neither plant, if two seeds are deposited, will mature; the chances of fully maturing are even slimmer if more than two seeds are planted on a single block.

Of course, each seed can be deposited manually, but this is a time-consuming and extremely monotonous chore, so efforts have been devised in an attempt to minimize the amount of human participation. One such effort that has been developed is to coat the seed with clay, thereby forming a pellet or capsule which can be more readily handled via certain automated techniques. As far as lettuce seeds are concerned, it should be recognized that these seeds are unsymmetrical, and the clay has helped in providing the requisite degree of symmetry to enable them to be handled more readily. Also, it should be taken into account that lettuce seeds, as well as other lightweight seeds, have a propensity for clinging to each other; the clay, of course, keeps them separated. Unfortunately, the clay coating has a deleterious effect on the seed as far as its subsequent germination is concerned, for it acts as a barrier to moisture needed for germination.

SUMMARY OF THE INVENTION

Accordingly, a general object of the present invention is to provide apparatus and a method for depositing individual seeds at precise points. More specifically, an aim of the invention is to start with a supply of randomly oriented seeds, which may or may not be symmetrical, and form a generally single-file stream of such seeds, or at least concentrate the seed in a fairly narrow flow path, so that individual seeds can be electrostatically diverted from the stream of seeds and delivered one at a time to the planting blocks that are to receive the seeds.

Another object of the invention is to deposit single seeds on individual planting blocks arranged in a row-type pattern, it being within the purview of my invention to successively deposit one seed on each block of one row and then move the next row into its seed-receiving position and so on until all of the blocks in the various rows have received a seed.

A further object is to obviate the drudgery that has been associated with the manual depositing of seed for subsequent hydroponic germination.

As an additional object, it is within the contemplation of the invention to encourage the later germination of the seed, as contrasted with the retarded germination experienced with coated seeds in the past.

Still another object of the invention is to provide a precision seeder that will deposit single seeds at desired locations, which seeder will be simple, both as to its construction and operation.

Yet another object of the invention is to provide apparatus that is quite rugged and not apt to get out of order readily, thereby avoiding loss of so-called "down time".

Briefly, my invention comprises a vibratory feeder that takes seed from a randomly oriented supply of seed, forming a single-file stream of seeds which continually passes a diverting station where at appropriate intervals a single seed is electrostatically picked from the flowing stream of seeds. The diverting action is achieved with a T-shaped diverter which is electrically energized at an appropriate voltage in relation to the vibratory feeder so that a particular seed is electrostatically diverted. Provision is made for humidifying the seed supply so that the seeds will all possess the same initial charge which promotes a more uniform deflection.

Once diverted electrostatically from the flowing stream of seeds a photoelectric sensor, which senses the passage of the diverted seed, causes the electrostatic field to be removed and the seed is pulled farther into the T-shaped diverted by a stream of air that takes over, conveying the seed to a distributor with the help of supplementally added air.

The distributor is appropriately indexed so that the individual seeds arriving at the distributor are delivered to various tubes extending downwardly to individual dispensers assembled in a laterally spaced relationship. An air release screen is employed which discharges the conveying air just above the dispenser with which it is associated so that the seed in each instance is gravitationally deposited on the particular planting block therebeneath.

The distributor is indexed the proper number of times for the number of blocks contained in the first row, and then the table on which the tray holding the various rows of planting blocks is moved just enough to position the next row of blocks beneath the dispenser assembly. A second photoelectric sensor senses the amount of table movement and assures that the various rows of planting blocks are successively positioned beneath the dispenser assembly. Consequently, a single seed is automatically deposited or "planted" on each planting block contained in a grid or pattern of such blocks.

BRIEF DESCRIPTION OF THE DRAWINGS

FIG. 2 is a top plan view of a portion of the seeder;

FIG. 3 is an enlarged view corresponding to FIG. 2, a portion of the electrostatic diverter being shown in section;

FIG. 4 is a sectional detail taken in the direcﬆon of line 4—4 of FIG. 3;

FIG. 5 is a view, partly in section, taken in the direction of line 5—5 of FIG. 2;

FIG. 6 is a side elevational view of the lower portion of the electrostatic seeder, the view being taken in the direction of line 6—6 of FIG. 1;

FIG. 7 is an enlarged sectional view taken in the direction of line 7—7 of FIG. 1 for the purpose of illustrating internal construction of one of the seed dispensers.

DESCRIPTION OF THE PREFERRED EMBODIMENT

Figure 1:
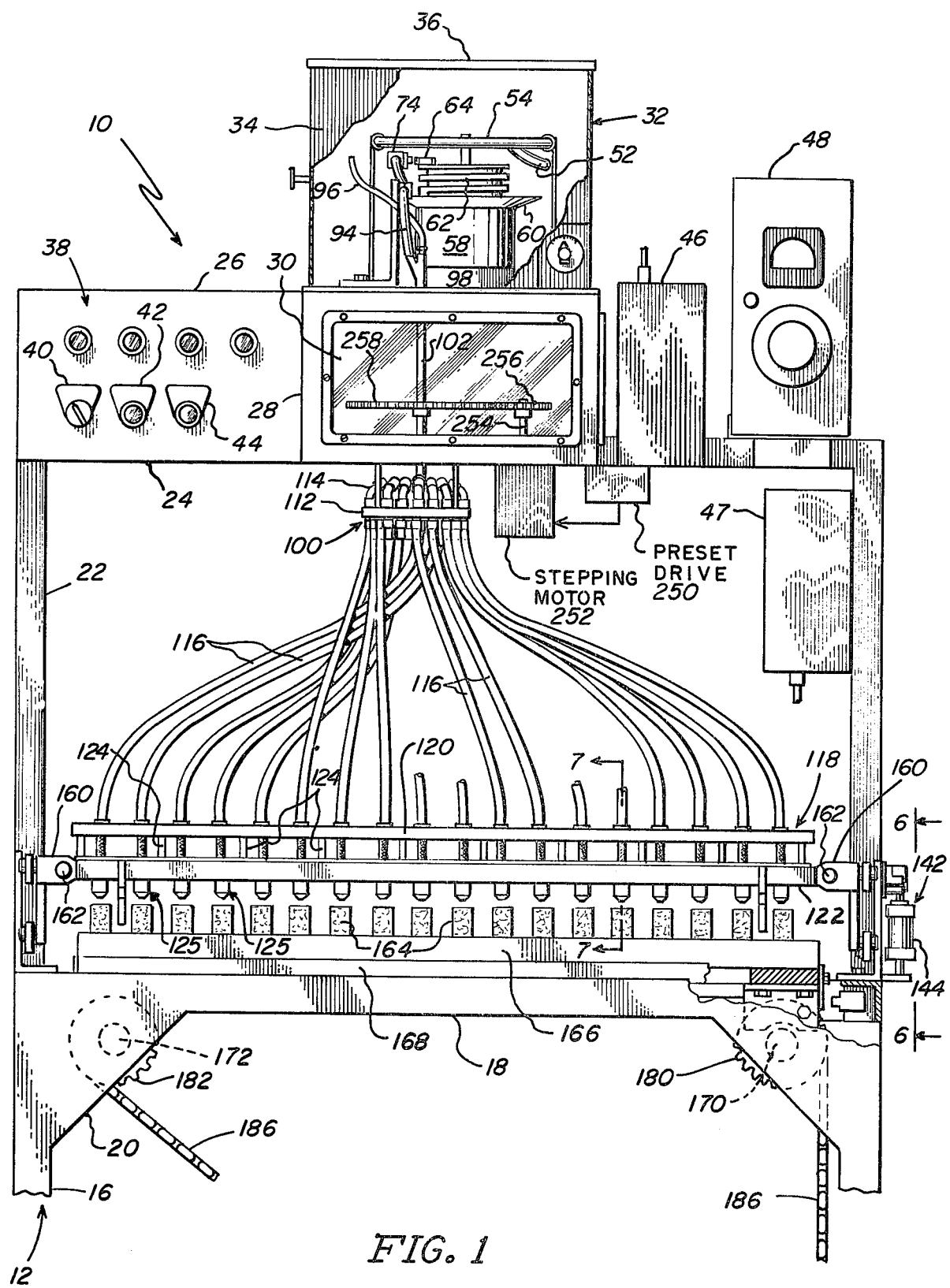
FIG. 1 is a front elevational view exemplifying my electrostatic seeder.

The apparatus exemplifying my electrostatic seeder has been denoted generally by the reference numeral 10. From FIGS. 1 and 8 it will be discerned that the seeder 10 includes a frame 12 having a base 14 (FIG. 8), upstanding sides 16 and an intermediate platform 18, there being gussets 20 reinforcing the platform 18 with respect to the sides 16. Additionally, vertical members 22 extend upwardly from the platform 18 to a lower mounting plate 24. A somewhat smaller mounting plate 26 is spaced above the plate 24.

Between portions of the plates 24 and 26 is a distributor gear drive compartment 28 having a viewing window 30. Superimposed on top of the compartment 28 is a seed pickup enclosure 32 having a front panel 34, a portion of which has been removed in order to expose to view certain important components that otherwise would be concealed. A removable cover 36 rests on the upper end of the enclosure 32 and provides ready access to the components contained in the enclosure 32 which components will be referred to shortly.

To the left of the distributor gear drive compartment 28, as viewed in FIG. 1, is a control panel 38 which includes an on-off power switch 40, a forward cycle switch 42 and a return cycle switch 44. To the right of the compartment 28 is a first control box 46 and somewhat below and to the right is a second control box 47, these two boxes containing therein logic circuitry and amplifiers used in conjunction with two photosensors later to be referred to. Also, there is an adjustable high voltage supply 48 which plays an important role in the practicing of my invention; more will be said later concerning the high voltage supply 48 and the manner in which it is energized and de-energized.

At this time, attention is directed to a humidifier 50 provided with a conduit 52 extending through the rear wall of the enclosure 32, as can be seen in FIG. 2. The conduit 52 connects with a circular manifold 54 formed with a plurality of discharge ports 56 through which vapor is introduced into the enclosure 32 in order to humidify its interior and add moisture to the seed contained therein.

Within the enclosure 32 is a continuous seed feeder 58. Actually, this is a vibratory feeder, such as a Syntron parts feeder, which has an adjustable speed control for varying its feed rate. The feeder 58 conventionally includes an annular hopper or bowl 60 at its base and a helical external ramp 62 extendig upwardly from the bowl 60. A special discharge spout 64 formed with a groove or trough 66 has been added for a purpose made clear below.

The bowl 60 contains a supply of randomly oriented seeds labeled 68. As will soon become manifest, the randomly oriented seeds constituting the supply 68 are advanced upwardly along the helical ramp 62 to form what can be termed a generally single file moving stream of seeds which has been identified by the reference numeral 70 in FIGS. 3 and 8, a sequence of arrows denoting the stream or path in FIG. 8. The flowing seed stream 70 need not be, strictly speaking, single file, but the stream should be relatively narrow in cross section so as to render the electrostatic field (still to be described) more effective. The stream 70 is of a continuous nature, those seeds that are not diverted being gravitationally returned to the bowl 60. However, as will be explained in detail shortly, a single seed path 72 exists by reason of the yet to be described electrostatic diversion of single or individual seeds from the flowing stream 70.

For the purpose of diverting single seeds from the stream or path 70 to form the path 72 consisting of only individual seeds taken from the path 70, there is a T-shaped electric and pneumatic diverter labeled 74. Whereas the seed feeder 58 is at ground potential, the diverter 74 has applied thereto a high DC voltage from the already-mentioned adjustable high voltage supply 48.

The diverter 74, it will be understood, is of metal and has a tubular body 76 and a perpendicularly oriented tubular head 78. The tubular body 76 has an inwardly tapering or converging entrance at 80 leading into a passage 82. There is a diametrically formed opening extending through the tubular body 76 at 83.

A first photoelectric sensor or scanner 84 includes a light source 86 and a photoelectric pickup 88. The photoelectric pickup 88 is connected to the logic circuitry contained in the control box 46, but it is not believed necessary to describe the logic circuitry or anything else contained in the box 46, as such hardware is conventional and also susceptible to variation. It might be pointed out that a very satisfactory photoelectric sensor 84 is manufactured as a unit by Banner Engineering Corporation, Plymouth, Minnesota 55441, being their Model FO-1. It should be recognized, though, that the purpose of the sensor 84 is to detect or sense when a seed has been diverted from the stream or path 70 into the passage 82.

After the presence of a seed in the passage 82 has been sensed, the photoelectric pickup 88 is responsible for temporarily disconnecting the high voltage supply 48 from the diverter 74. In other words, once a seed has entered into the diverter 74 by reason of the forces of attraction developed in accordance with Coulomb's Law, no additional seeds should be diverted until the seeder 10 is ready to receive another seed; when the seeder 10 is ready for the next seed, the electrostatic field will be restored as will be explained later.

Returning to the transverse tubular head 78, from FIG. 3 it can be perceived that it is formed with a passage 90, having a right angular relationship with the passage 82, the passage 82 leading directly into the passage 90 intermediate its ends. A tube 92 connects at one end with the passage 90, the tube 92 being connected at its other end to a source of air under pressure which has merely been labeled "#1 AIR IN" in FIGS. 2, 3 and 8. It can be pointed out at this stage of the description that the air flowing through the passage 90 acts in a venturi manner to create a region of reduced pressure where the passage 82 joins the passage 90 so that once the seed has been electrostatically diverted, the seed then follows the single seed path labeled 72, carried by the air supplied by the air tube 92.

At the other end of the passage 90 from the tube 92 is a conveying tube 94 that receives the air supplied by the tube 92, and also the single seed entrained therein, and pneumatically advances the single or individual seed in the direction of the arrows denoting the single seed path 72. Inasmuch as a somewhat limited air flow results from the supply provided through the tube 92, it has been found desirable in practice to employ a second air tube 96 which forms a "Y" at 98, with the tube 94, as can best be observed in FIG. 5. As with the tube 92, the supplemental air supplied through the tube 96 is under pressure and the air so supplied has been labeled "#2 AIR IN" in FIGS. 2 and 8.

A seed distributor has been designated generally by the reference numeral 100. It comprises a rotatable vertical tube 102 having an angled discharge nozzle 104 at its lower end and a coupling 106 at its upper end communicating with the Y 98 so as to receive the single or individual seed being conveyed downwardly from the conveying tube 94 through the Y 98. The coupling 106, it will be understood, permits the tube 102 to rotate. The vertical tube 102 is journaled for rotation in ball bearings 108 and 110, the ball bearing 108 having its outer race in the previously referred to mounting plate 24 and the ball bearing 110 having its outer race mounted in the previously mentioned mounting plate 26.

The distributor 100 also comprises a tube support plate or disc 112 having mounted therein a number of elbows 114, as can be seen in FIG. 1 but which are better shown in FIG. 5 because only several have been shown and also because of the larger scale of this latter figure. The upper ends of the various elbows 114 are juxtaposed with the lower or discharge end of the nozzle 104. To prevent undue loss of air, which it must be remembered is conveying one seed at a time, the entrance or upper end of each elbow 114 should be located so that only a small clearance exists between the lower or discharge end of the nozzle 104 when the nozzle 104 is in angular registry with that elbow 114.

Each elbow 114 has a flexible distributing tube 116 extending downwardly therefrom. The various tubes 116 should be as vertical and slope as much as practical, for the more vertical these tubes are the less conveying air is needed and the less chance there is that a seed will stick to the tube it is traveling through. Stated somewhat differently, it is well to maintain a relatively high seed speed, and the gravity effect stemming from the greater tube slope assists in keeping the seed moving.

The various distributing tubes 116 lead downwardly to a seed dispenser assembly 118 which includes a holder bar 120 and a housing bar 122 therebeneath, there being spacers 124 that maintain the two bars 120, 122 in their vertically spaced relationship. Each delivery tube 116 has communication with an individual dispenser 125, the details of which appear in FIG. 7.

More specifically, each dispenser 125, as can be seen from FIG. 7, includes a recess or bore 126 having a reduced diameter lower end which forms a flange or shoulder at 127. Each dispenser 125 further includes an insert or bushing 128 having a flange 129. Still further, each dispenser 125 comprises a tubular plunger 130 having a flange 132 at its upper end and a tapered seed outlet 134 at its lower end. A coil spring 136 contained in the recess or bore 126 acts against the flanges 129 and 132 so as to bias each plunger 130 downwardly. However, the coil spring 136 in each instance is sufficiently resilient so as to yield or compress for a purpose presently to be explained. Overlying the flanges 129 of the inserts or bushings 128 of all of the dispensers 125 is a retainer strip 137, the strip 137 being affixed to the upper side of the housinng bar 122.

Associated with each dispenser 125 is an air release screen 138 that is attached to the lower end of each delivery tube 116 by means of a fitting 139. As their name implies, the screens 138 release the conveying air just above the dispensers 125 so that the seed being conveyed to a given dispenser 125 then falls gravitationally. Appearing pictorially in FIGS. 1 and 6 is a mechanism 142 for raising and lowering the entire seed dispenser assembly 118. In FIGS. 1 and 6 the mechanism 142 includes an actuator in the form of an air cylinder 144, whereas in FIG. 8 for the sake of simplicity the mechanism 142a illustratively makes use of a solenoid 144a. In FIGS. 1 and 6 the air cylinder 144 utilizes a piston rod 146, whereas in FIG. 8 the solenoid 144a employs a plunger or armature 146a and an encircling coil spring 147a for raising the dispenser assembly 118, energization of the solenoid causing the armature 146a to lower the assembly 118. It should be emphasized that the actuator can constitute either the air cylinder 144 or the electric solenoid 144a, the selection of the solenoid 144a simplifying the diagram that would otherwise be rendered more complex if the controls for the air cylinder 144 were to be superimposed on FIG. 8.

Continuing with the description of the mechanism 142, a bracket 148 appears in FIGS. 1 and 6, there being a crank arm 150 in FIG. 6 which transmits motion from the piston rod 146 to a parallel linkage 152 composed of upper and lower links 154 and 156, respectively. The ends of the links 154, 156 remote from the air cylinder 144 are pivotally connected to a plate 158 mounted at one end of the dispenser assembly 118. A duplicate parallel linkage 152 is also employed at the left side of the seeder 10 as viewed in FIG. 1. Consequently, there is a second end plate 158 associated with the other end of the seed dispenser assembly 118. The end plates 158 each have a support fork 160 extending inwardly toward the dispenser assembly 118, there being a pin 162 extending into the housing bar 122 so that the dispenser assembly 118 is fully supported at both ends when being raised or lowered by the mechanism 142.

In the hydroponic growing of lettuce, for instance, individual planting blocks of a fibrous material are utilized. Virtually any number of such blocks can be accommodated as far as the seeder 10 is concerned. However, a practical number for a single row of such blocks has been found to be 18. The 18 blocks appearing in FIG. 1 have each been labeled 164 and are contained in a tray 166 along with any preferred additional rows of such blocks 164 (see FIG. 6). A tray 166 is carried on a transport table 168.

The transport table 168 is rectilinearly movable in order to advance the various rows of planting blocks 164 into position beneath the seed dispenser assembly 118 so that each block will receive a single seed as will be better understood hereinafter. Various ways can be resorted to for the purpose of advancing the table 168. In the illustrated instance a pair of threaded shafts or feed screws 170 and 172 are employed, there being one at each side of the seeder 10 as can be perceived in FIGS. 1 and 8. The opposite ends of the shafts or screws 170, 172 are appropriately journaled on the frame 12, more specifically by bearings, such as the bearing 173 (FIG. 6), mounted on the gussets 20. As can be seen from FIG. 6, a pair of flanged nut members 174 and 176 are attached to the underside of the transport table 168 so as to advance the table 168 when the shafts or screws 170, 172 are rotated in one direction and to retract the table when oppositely rotated. The manner of rotating the screws 170, 172 will now be described. To accomplish the rotation, there is a driven sprocket 180 secured to one end of the feed screw 170 and a driven sprocket 182 secured to the corresponding end of the screw 172. These sprockets 180, 182 appear in both FIGS. 1 and 8. However, a drive sprocket labeled 184 appears only in FIG. 8. It will be noted that a chain 186 is entrained about all three sprockets 180, 182 and 184. It will be appreciated that the drive sprocket 184 is mounted on a longitudinally directed shaft 188 that is journaled for rotation in suitable bearings (not visible) mounted on the frame 12. Also, as can be appreciated from FIG. 8, the shaft 188, in addition to having the sprocket 184 mounted thereon, has a spur gear 190 thereon which is in mesh with a worm gear 192 on a shaft 194 that extends from an electromagnetically disengageable and spring engageable clutch 196. The clutch 196 is driven from a shaft 198 extending from a reversible electric motor 200.

Figure 8:
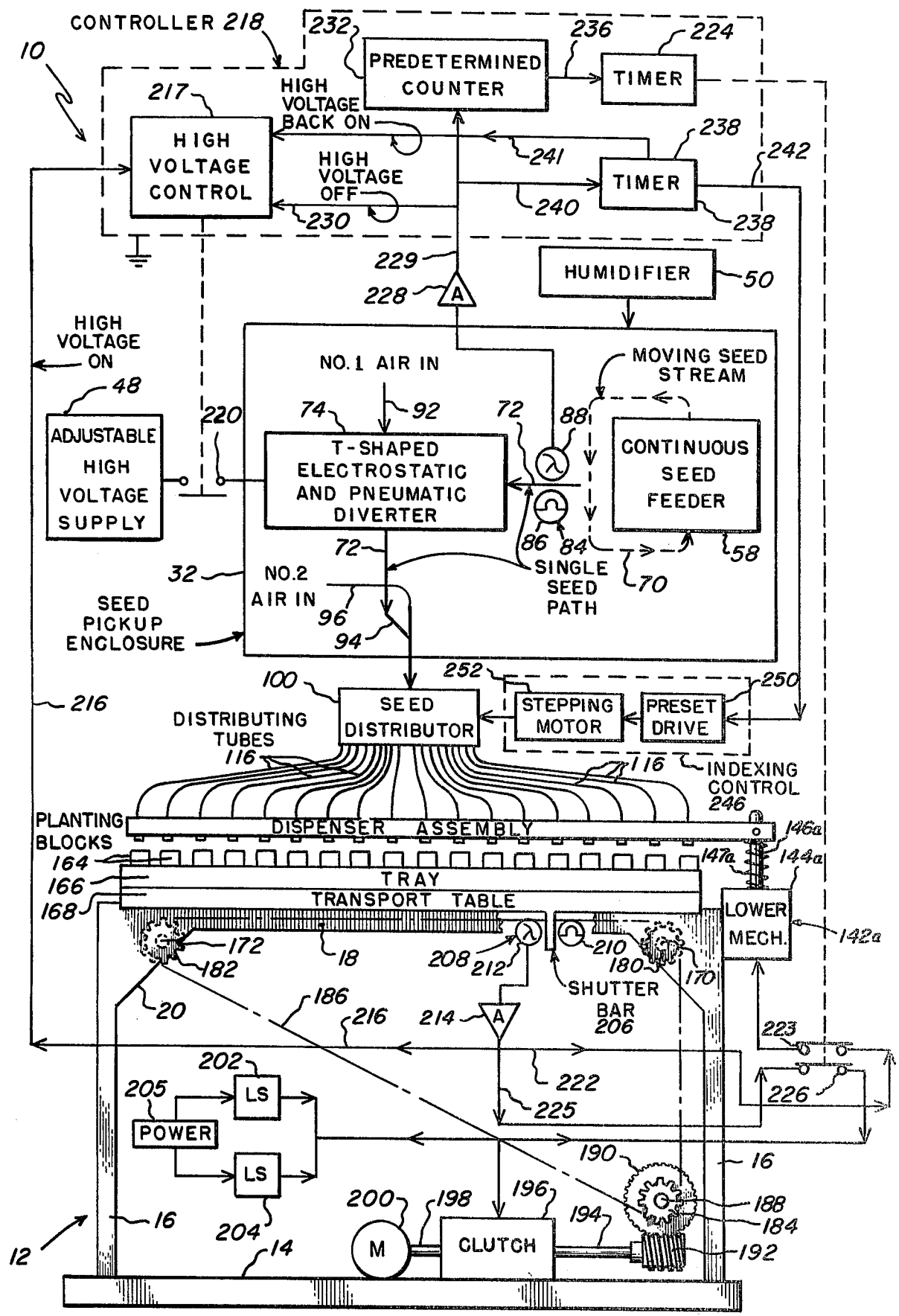
FIG. 8 is a combined block and schematic diagram depicting with slight modification the more important components of the seeder pictured in FIG. 1.

In FIG. 8 there are two parallel connected limit switches 202 and 204 connected in circuit with a source of power labeled 205, the switch 202 being at the far end of the seeder 10 and the switch 204 at the near end thereof. Actually, the limit switch 204 appears pictorially in FIG. 6. It will be appreciated that when the transport table reaches opposite ends of its travel that the appropriate limit switch 202 or 204 is closed to cause the clutch 196 to become disengaged so as to stop any further movement of the table 168. As far as advancing the transport table 168 in the direction of the limit switch 202, it is important to do this in increments or steps corresponding to the spacing between rows of planting blocks 164. The incremental feed control which achieves this includes a notched shutter bar 206 one side of which is visible in FIG. 6 and one end of which can be seen in FIG. 8. Actually, the shutter bar 206 is attached to the under side of the transport table 164 and moves in unison therewith. A photoelectric sensor or scanner 208, the same as the earlier-mentioned sensor 84, coacts with the shutter bar 206. More specifically, the sensor or scanner 208 includes a light source 210 disposed at one side of the shutter bar 206 and a photoelectric pickup 212 at the other side. The control box 47 is used in this instance, but as with control box 46 for the sensor 84, no need is seen for describing its contents, being that the circuitry is conventional. To simplify FIG. 8 as much as possible, an amplifier 214, which is actually housed in the box 47 which is part of the Banner Model FO-1, has been shown connected to the photoelectric pickup 212 for supplying a signal via a line 216 extending therefrom to a high voltage control circuit 217 contained within a controller indicated generally by the reference numeral 218. Although the controller 218 is of a solid state design, it will be helpful, it is believed, to show normally open relay contacts 220, which are operated by the control circuit 217, that function when closed to connect the high voltage source 48 to the diverter 74. Inasmuch as the controller 218 also contains other components yet to be referred to it will be well to identify the controller 218. It is manufactured by Texas Instruments Inc., Dallas, Tex. 75222 as their 5TI System employing a programmer (5TI 2000), sequencer (5TI 1000), input/logic interface module (5TI5) and input/output modules.

Another line 222 extends from the output side of the amplifier 214 to the solenoid 144a. This line 222 has a pair of normally closed contacts 223 in circuit therewith which are controlled by a timer 224, also part of the controller 218 and which will presently be referred to in greater detail. All that need be appreciated at this point is that, when the contacts 223 are closed, the solenoid 144a is energized so as to lower the seed dispenser assembly 118, at the same time compressing the coil spring which at a subsequent time raises the dispenser. Of course, the mechanism 142a, as shown in FIG. 8, is deemed to contain a solenoid 144a as the actuator in contradistinction to the air cylinder 144 depicted in FIGS. 1 and 6. As already stated, the use of an electric solenoid permits a simplified portrayal of one control facet of the seeder 10.

Still another line 225 extends from the amplifier 214, a signal delivered over this line causing the clutch 196 to be electrically disengaged. As will be more thoroughly explained during the operational sequence hereinafter given, when one of the teeth of the shutter bar 206 cuts off the light from the light source 210 to the photoelectric pickup 212, the darkened condition of the photocell associated with the pickup 212 will rise to provide a signal to the amplifier 214 to stop the table 168 at the proper location. When the table 168 is to be moved again, additional normally closed contacts 226 when opened by the timer 224 will break the continuity as far as the line 225 is concerned and the clutch 196 will re-engage under the influence of its mechanical spring to couple the motor 200 to the worm gear 192.

As with the photosensor or scanner 208, the earlier mentioned photosensor or scanner 84, for the sake of facile illustration, has an amplifier 228 contained to its photoelectric pickup 88. This amplifier is contained in the control box 46 but is shown separately, as is the amplifier 214, for easier understanding. Hereagain it is part of the Banner photoelectric unit, Model FO-1. The amplifier 228 is connected to the controller 218 via a line 229 and to the control circuit 217 by a line 230. At this point, it may be of general assistance to explain that the previously mentioned line 216 functions as a "HIGH VOLTAGE ON" line and the line 230 functions as a "HIGH VOLTAGE OFF" line. However, it is believed that the role played by the "HIGH VOLTAGE ON" and "HIGH VOLTAGE OFF" lines, as well as a "HIGH VOLTAGE BACK ON" line yet to be referred to, will be better understood from the operational description which follows later.

A predetermined counter 232 is utilized. The counter 232 is connected to the output of the amplifier 228 by a line 234. The predetermined counter 232, it can be mentioned, counts to whatever number corresponds to the number of planting blocks 164 in one row on the tray 166. In the illustrative situation, the count would be 18, for 18 such planting blocks 164 have been shown and also 18 dispensers 125 have been selected, there being one such dispenser 125 for each planting block 164 in a given row as is believed evident from what has already been described. When the counter 232 reaches its predetermined count, 18 in this instance, a signal is forwarded therefrom via a line 236 to the previously mentioned timer 224. After a short interval, that is after the timer 224 times itself out, it opens the contacts 223 and 226 to de-energize the solenoid 144a in one instance and to engage the clutch 196 in the other.

An additional timer 238, which is still another component belonging to the controller 218, is connected to the amplifier 228 by means of a line 240. The timer 238 is started when the sensor 84 forwards a signal indicating that a seed has been diverted and times itself out only after a period of time has elapsed that is sufficient to permit the diverted seed to pass through the distributor 100. A line 241 extends from the timer 238 to the controller 218, functioning as a "HIGH VOLTAGE BACK ON" line. Another line 242 extends from the timer 238 to an indexing control 246 which controls the operation of the distributor 100. More specifically, the indexing control 246 includes a preset drive 250 that supplies the appropriate number of pulses to a stepping motor 252 after the time period for which the timer 238 has been set has expired. Stepping motors, as generally understood, provide controlled rotational steps in response to sequential pulses or in response to an AC output. The preset drive 250 supplies a sufficient number of pulses in this situation so that the shaft 254 driven by the stepping motor 252 rotates through a given angle.

Inasmuch as stepping motors are commercially available for various angular resolutions, that is step sizes, the number of planting blocks 164 constituting a row can be selected in accordance with whatever step size is decided upon. However, it is planned that the seeder 10 be rendered more versatile by using a simple gear train composed of gears 256 and 258, gear 256 being attached directly to the upper end of the shaft 254 as can be seen in FIG. 1 and the gear 258 affixed to the rotatable vertical tube 102 of the distributor 100.

Consequently, if the step size for whatever stepping motor 252 is most readily available is not exactly the right angle for the number of planting blocks 164, the gears 256 and 258 can be selected as to the number of teeth thereon so that the proper angular movement is realized for the tube 102. In this regard, when 18 dispensers 125 are utilized, then it follows that 18 elbows 114 will be embodied in the distributor 100 and under these conditions then the tube 102 must be rotated through successive 20° angles when advancing the nozzle 104 from one elbow 114 to the next. Of course, it will be appreciated that other indexing mechanisms can be utilized in that the stepping motor 252 is only illustrative of one way in which the indexing of the distributor 100 can be achieved.

OPERATION

Having presented the foregoing description, the operation of my seeder 10 is believed to be relatively straightforward. Nonetheless, an operational description should help in appreciating the full benefits to be derived from a practicing of the invention.

Although all of the power details have not been set forth, the first operational step is to turn on the main power which is done at the control power 38 by closing the on-off switch 40. Inasmuch as the seeder 10 in actual practice makes use of air, there is also an air valve that must be turned on. For instance, in referring to FIGS. 1 and 6, the air cylinder 144 has been mentioned. On the other hand, as far as FIG. 8 is concerned, the use of an electric solenoid 144a has been mentioned as an actuator lending itself more readily to simple diagramming.

The next step in the operational sequence is to switch on the forward cycle switch 42 which energizes the motor 200 and causes the transport table 168 to be driven forwardly by means of the motor 200 acting through the spring-engaged clutch 196, the chain 186 entrained about the sprockets 180, 182 and 184 and the feed screws 170, 172.

From FIGS. 6 and 8, it can be appreciated that the sensor 208 is responsible for stopping the forward movement of the transport table 168 at the proper location to bring the first row of planting blocks 164 into juxtaposition or registry beneath the seed dispenser assembly 118. What transpires is that the notched shutter bar 206 is advanced in unison with the table 168, being attached to the underside thereof, and when the first tooth moves into a light-interfering or blocking position between the light source 210 and the photoelectric pickup 212. The voltage signal provided by the sensor 208, after amplification at 214, is delivered via the line 225 to the clutch 196, the contacts 226 controlled by the timer 224 being closed, which disengages the clutch 196 and stops the table 168 at the proper location so that the lowering of the dispenser assembly 118 results in the plungers 130 contacting the upper ends of the planting blocks 164 in the first row.

Simultaneously, the amplified voltage signal is also forwarded to the controller 218 via the line 216 which results in the contacts 220 being pulled closed. This energizes the T-shaped diverter 74 because the now closed contacts 220 connect the high voltage supply 48 to the diverter 74.

Also, concurrently with the foregoing a signal is forwarded to the solenoid 144a of the lowering mechanism 142a, doing so over the line 222 and through the normally closed contacts 223 controlled by the timer 224 which are still closed at this time. This causes the dispenser assembly 118 to be lowered with the consequence that the various tubular plungers 130 belonging to the dispensers 125 have their discharge ends pressed against the planting blocks 164. As can be understood from FIG. 7, the coil spring 136 forming a part of each dispenser 125 is compressed to whatever degree is needed. Thus, the particular height of any planting block 164 is not crucial for an accommodation is made possible by the biasing action of the various coil springs 136.

Closing of the switch 40 also energizes the vibratory seed feeder 58. Therefore, the feeder 58 forwards seeds from the supply 68 up the helical ramp 62. During their upward helical travel they form virtually a single file stream by the time they reach the discharge spout 64, the narrow continuously moving stream having been identified by the reference numeral 70. The seeds do not have to be confined to a precise single file arrangement, as already explained, but it should be appreciated that the stream 70 of moving seeds is of relatively narrow width so that the seeds are discharged from the end of the groove or trough 66 in a sufficiently restricted fashion so that the now energized diverter 74 can place an electric charge on one of the seeds flowing in the stream 70 with the consequence that that seed is attracted into the tapered entrance 80 and on into the passage 82 as can be discerned from FIG. 3. The seed that enters the entrance 80 is centered within the passage 82 by reason of the electrostatic field that exists. Although not entirely evident from FIG. 4, the discharge end of the groove or trough 66 in the spout 64 is at an elevation somewhat above the entrance 80 to the diverter 74. In actual practice, it has been found desirable to have the stream 70 discharged from the spout 64 so that the stream 70 is moving at approximately 45° past the entrance 80, thereby providing a horizontal vector component that is in the direction in which the electrostatic forces are acting.

Once in the passage 82, the single seed, now following the path 72, that has been removed from the path 70 continues through the passage 82, induced to do so under the influence of the air flowing through the passage 90. In other words, the air supplied through the tube 82 produces a venturi-like action, causing continued or forward movement of the individual seed not only from the passage 82 into the passage 90 but on through the passage 90 into the conveying tube 94.

The sensor or scanner 84, it should be pointed out, is instrumental in detecting the passage of the individual seed past the diametrical opening 83. What happens is that at least some of the light from the source 86 is blocked and the photoelectric pickup 88 receives less light than with no seed which causes a signal to be supplied to the controller 218 over the line 230, such signal causes the contacts 220 to return to their open condition, this action de-energizing the diverter 74 because the voltage being supplied from the high voltage supply 48 is no longer applied to the diverter because of the open contacts 220. This is an important feature because only one seed at a time should be processed as will be appreciated by the portion of the operational description now to be presented.

The diverted seed traversing the single seed path 72 proceeds through the conveying tube 94 by reason of the air supplied through the tube 92. However, the flow of air through the tube 92 is deliberately kept fairly low, so additional air is supplied through the tube 96, entering at the Y 98 to supplement or augment the conveying action resulting from the rather restricted initial supply of air. This assures a fast delivery of the individual seed to the seed distributor 100 without having to use an air velocity at any point that would result in undue turbulence.

When the seed reaches the distributor 100, more specifically the rotatable tube 102 thereof, it moves downwardly through the tube 102 and into the angled discharge nozzle 104 at the lower end of the tube 102. At this stage, the nozzle 104 is in registry with the particular elbow 114 that is to supply the seed to the particular dispenser 125 located the farthest to the left as viewed in FIGS. 1 and 8. From FIG. 5 it will be observed that the discharge end of the nozzle 104 is in close proximity with the upper end of the elbow 114 at the left in FIG. 5. Consequently, very little air flowing through the tube 102 escapes, virtually all of the conveying air entering the elbow 114 which causes the individual or single seed to be carried through the leftmost elbow 114 into the delivery tube 116 that extends downwardly to the seed dispenser 125 at the extreme left as viewed in FIGS. 1 and 8.

At the time the first seed passed the sensor 84, not only was the high voltage supply 48 cut off from the distributor 74, but a pulse signal was forwarded over the line 240 to the timer 238. More specifically, the time interval or delay provided by the timer 238 is sufficient so that the first seed that has been diverted and which is traveling over the single seed path 72 has time to pass through the distributor 100 and even onto the planting block 164 at the left in the first row. Thus, the timer 238 delays forwarding a signal over the line 242 until the distributor is to be advanced or indexed. The signal sent over the line 242 triggers the preset drive 250 so as to supply whatever number of pulses are required to step the motor 252 through the appropriate angle to cause the vertical tube 102 to swing or advance the nozzle 104 to the next elbow 114 and in this way condition the seeder 10 so that the next seed to be diverted will be delivered to the planting block 164 that is the second from the left end. Before the next seed can be diverted the electrostatic field must be restored. This is done by the timer 238 which sends a signal over the line 242 to index the distributor 100 as explained above, and in the illustrated situation sends a signal over the line 241 to cause the controller 218 to re-apply high voltage to the diverter 74.

It is believed readily apparent that the distributor 100 is indexed repeatedly until all of the planting blocks 164 in the first row have received a seed. The high voltage supply 48 is repeatedly connected and disconnected from the diverter 74 during the seeding of the 18 blocks 164. In the exemplary situation, 18 planting blocks 164 constitute the first row (and also 18 such blocks are in each additional row). However, when the predetermined counter 232 has counted to 18, since 18 planting blocks 164 have been selected for each row, then a signal is forwarded over the line 236 to the timer 224. The timer 224 first provides a sufficient time delay for the last seed (the 18th) to reach the rightmost dispenser 125 and for the seed to fall onto the particular planting block therebeneath. This then de-energizes the solenoid 144a and, under the influence of the return spring 147a, the dispenser assembly 118 is elevated or raised so that the plungers 130 no longer engage the tops of the planting blocks 164 of the first row of such blocks. The opening of the contacts 226 enable the clutch 196 to re-engage by spring action and the table 168 moves forwardly. The time during which the timer holds the contacts 226, as well as the contacts 223, open is of sufficient duration so that by the time the contacts 226 close the photoelectric pickup 212 of the sensor 208 is again receiving light from the source 210 with the result that no signal from the sensor 208 is transmitted over any of the lines 216, 222 or 225. Most important at this time is that the electromagnetic clutch 196 is de-energized and its spring acts to cause engagement with the drive motor 200. It must be kept in mind that the clutch 196 is disengaged when electrically energized and engaged when not electrically energized.

The table 168 stops when the next tooth of the shutter bar 206 blocks light from the source 210 to the photoelectric pickup 212. Once blocked, then a signal is again forwarded from the sensor 208 to the clutch 196 to disengage the worm gear 192 from the motor 200. The signal from the sensor 208 not only disengages the clutch 196 but also energizes once again the solenoid 144a to lower the dispenser assembly 118. Also, the signal from the sensor 208 goes over the line 216 to reapply the high voltage from the supply 48 to the diverter 74 by causing the controller 218 to again close the contacts 220.

The same sequence of events is repeated for each of the planting blocks 164 constituting the second row. In other words, a single seed is first diverted from the stream 70 and traverses the single seed path 72 to the distributor 100, more specifically through the rotatable vertical tube 102 and nozzle 104 which is again in registry with the elbow 114 as depicted in FIG. 5. The stepping motor 252 is stepped through the proper angles so that a seed is deposited on each of the planting blocks 164 belonging to the second row and so on for each block of each row.

One important feature of the invention is the provision of the various air release screens 138. Owing to the fact that each individual seed is being advanced over its path 72 by pneumatic action, it is important to cause the air that is doing the conveying to be released so that the seed gravitationally drops down through the particular dispenser 125 that it is to pass through. Stated somewhat differently, and which can be understood from FIG. 7, when the air is released through the screen 138, the seed simply falls downwardly through the bushing 128 into the plunger 130 and then through the tapered seed outlet 134 onto the block 164 engaged thereby. The particular seed is always precisely directed to the desired location which is the center point on the particular block 164 with which the plunger 130 is then in contact. Once again, it should be understood that the coil spring 136 compresses so that the lower end 134 of the plunger 130 can readily abut the particular planting block 164 that it is intended to deposit a seed upon.

It should be apparent that the various rows of planting blocks 164 receive seeds in the foregoing manner and that when all of the rows on the tray 166 have received their individual seeds, then the limit switch 102 is closed when the table 168 reaches the far end of the platform 18 of the frame 12 by reason of the clutch 196 being energized therethrough to overcome the spring action that produces engagement.

When the forward drive or forward movement of the transport table 168 is terminated as described above, the table 168 is automatically returned to its original position. Preferably, the motor 200 is of a type in which a fast reverse speed can be employed so that the table 168 is returned at a faster rate than it is incrementally advanced in a forward direction. The circuitry for returning the table 168 is not disclosed inasmuch as it could be done manually via the return cycle switch 44, which is normally used to terminate a planting cycle should circumstances so require which arrangement also need not be described since it does not constitute part of my invention. The limit switch 204 is responsible for terminating the reverse or return run of the transport table 168, this switch being shown pictorially at the left in FIG. 6 and in block form in FIG. 8. The operator can then remove the tray 166 and the various planting blocks 164 that are now in readiness for being moved into the hydroponic growing area. A second tray 166 with the desired number of new planting blocks 164 is then placed on the transport table 168 and the forward cycle switch 42 again actuated so that the entire operation is repeated for the new tray.

It will be understood that the high voltage applied to the diverter 74 from the supply 48 is susceptible to variation, depending upon the mass of the seed and also the moisture content thereof. Quite obviously, if the seed to be planted is all, say bibb lettuce seed, the mass of each seed would be virtually the same. However, if a different species of seed is to be planted, the voltage would be increased or decreased, for whatever seed is to be handled.

As for the moisture content of the seed, the seeds cannot be too dry or they will not be conditioned for uniform deflection. It should be recognized that once the appropriate high voltage is applied, then no further adjustments are made as long as the seeds in the stream 70 have the same moisture content. For this reason the humidifier 50 is provided and the relative humidity within the enclosure 32 is maintained to provide the proper moisture for whatever seed is to be processed. The moisture content of the seed can vary over fairly wide limits for a given voltage. Somewhere within a range of 50 to 80% relative humidity is generally satisfactory. The important factor is that the seeds all have substantially the same moisture content. Therefore, the humidifier 50 should be turned on in advance of the time when the planting procedure is to be initiated so that the seeds will have the opportunity to become uniformly moistened.

As for the range of voltage to be sufficient by the supply 48, this can be almost anywhere between 1,000 and 5,000 volts, 3,500 perhaps being an average value. One nicety of the invention is that after the humidity has been stabilized within the enclosure 32, the operator need only increase the voltage until he observes the deflection of a single seed from the moving stream 70. Actually, the "watching" for the diversion of the first seed is performed automatically, for the sensor 84 senses the diverted seed and the rest of the planting program that has been described automatically ensues. It is important to recognize, though, that the operator should start with a voltage that is too low and then increases the voltage to the proper value which results in a deflection of one seed at a time. If the operator starts with too high a voltage, more than one seed is apt to be deflected. Consequently, it should be appreciated that it is far better to start low and raise the voltage to the appropriate potential.

I claim:

1. Seeding apparatus comprising means providing a supply of moving seeds, means for electrostatically diverting seeds from said moving supply, a plurality of seed dispensers, and means for receiving seeds from said diverting means and sequentially delivering the diverted seeds to each of said dispensers at successively spaced time intervals.

2. Seeding apparatus comprising means providing a supply of moving seeds, means for diverting seeds from said moving supply, means for applying a voltage to said diverting means to develop an electrostatic field sufficient to effect the diversion of a seed, means responsive to the entry of said diverted seed into said diverting means for removing said voltage from said diverting means, a plurality of seed dispensers, and means for receiving seeds from said diverting means and delivering the diverted seeds to said dispensers.

3. Seeding apparatus in accordance with claim 2 including means for again applying said voltage to said diverting means after said diverted seed has been received by said receiving and delivering means.

4. Seeding apparatus in accordance with claim 3 in which said voltage is re-applied to said diverting means after an interval of time sufficient to allow said diverted seed to reach one of said dispensers.

5. Seeding apparatus in accordance with claim 2 in which said responsive means includes a photoelectric sensor.

6. Seeding apparatus in accordance with claim 2 including means for pneumatically conveying the electrostatically diverted seeds to said receiving and delivering means.

7. Seeding apparatus in accordance with claim 6 in which said diverting means includes a first passage into which said seed is electrostatically diverted and a second passage extending at an angle with respect to said first passage, and means for supplying air to one end of said second passage for pneumatically conveying said diverted seeds toward said receiving and delivering means.

8. Seeding apparatus in accordance with claim 7 in which said receiving and delivering means includes a distributor for receiving successively diverted seeds from said diverter and delivering said successively diverted seeds to said dispensers.

9. Seeding apparatus in accordance with claim 8 in which said receiving and delivering means includes a first tube extending from the other end of said second passage to said distributor and a plurality of second tubes corresponding in number to the number of dispensers extending from said distributor to said dispensers.

10. Seeding apparatus in accordance with claim 9 in which said distributor includes a movable nozzle for directing one diverted seed to one of said second tubes and successive seeds to the other of said second tubes.

11. Seeding apparatus in accordance with claim 10 in which said distributor includes rotatable vertical tube having communication at its upper end with said first tube extending from said other end of the second passage, said nozzle extending angularly from the lower end of said rotatable tubes, and said distributor further including a number of circularly arranged elbows having their upper ends at an elevation so as to be near the lower or discharge end of said nozzle when said nozzle is moved into registry with the upper ends of said elbows.

12. Seeding apparatus in accordance with claim 11 including means for indexing said nozzle through predetermined angles from one elbow to the next.

13. Seeding apparatus in accordance with claim 12 including means between each second tube and each dispenser for releasing the conveying air so that each diverted seed is for all intents and purposes gravitationally deposited.

14. Seeding apparatus in accordance with claim 13 in which said air releasing means includes a cylindrical screen in each instance.

15. Seeding apparatus in accordance with claim 14 in which said dispensers are assembled in a laterally spaced relation, the apparatus including means for raising and lowering said assembly.

16. Seeding apparatus in accordance with claim 15 in which each dispenser includes a spring biased plunger.

17. Seeding apparatus comprising a diverter, means for supplying a stream of moving seeds past said diverter, means for supplying a relatively high voltage to said diverter to establish an electrostatic field for causing a seed contained in said stream to be diverted, photoelectric means for sensing when said seed has been diverted to disconnect said voltage supplying means from said diverter, a seed distributor, means for pneumatically conveying said electrostatically diverted seed to said distributor, a plurality of laterally spaced dispensers, a plurality of tubes extending between said distributor and said dispensers, there being one tube for each dispenser, timing means for reconnecting said voltage supplying means to said diverter after a sufficient time has elapsed so that said diverted seed has passed through said distributor, and means controlled by said timing means for indexing said distributor so as to deliver successively diverted seeds to said plurality of tubes, whereby seeds are successively delivered to said dispensers via said plurality of tubes.

18. Seeding apparatus in accordance with claim 17 including a table movable beneath said dispensers, and means for moving said table after a seed has been delivered to each of said dispensers.

19. Seeding apparatus in accordance with claim 18 in which said table is movable beneath said dispensers, said apparatus including means for stopping said table after it has moved a preferred distance beneath said dispensers.

20. Seeding apparatus in accordance with claim 19 in which said dispensers are movable vertically in respect to said table, and means controlled by said stopping means for lowering said dispensers.

21. Seeding apparatus in accordance with claim 20 in which said stopping means effects connection of said voltage supplying means to said diverter so that said photoelectric means can effect disconnection thereof when a diverted seed is sensed.

22. Seeding apparatus in accordance with claim 18 in which said means for moving said table includes a predetermined counter controlled by said photoelectric means.

23. Seeding apparatus in accordance with claim 22 including second timing means controlled by said predetermined counter for raising said dispensers after a predetermined count has been reached.

24. Seeding apparatus in accordance with claim 23 in which said second timing means causes said table to be moved after said predetermined count has been reached.

25. Seeding apparatus comprising means for successively diverting seeds from a flowing stream of seeds, a plurality of dispensers, a distributor for receiving said seeds from said diverting means, and means extending from said distributor to each dispenser for sequentially directing said diverted seeds to each of said dispensers at successively spaced time intervals.

26. Seeding apparatus comprising means for diverting a seed from a flowing stream of seeds, a plurality of dispensers, a distributor for receiving a seed from said diverting means and directing said diverted seed to one of said dispensers, a tube extending to each dispenser from said distributor, means for supplying air through each tube to convey a seed to the dispenser associated therewith, and means for releasing said air just before each dispenser.

27. Seeding apparatus in accordance with claim 26 in which each releasing means includes a screen element.

28. Seeding apparatus in accordance with claim 27 in which each screen element is cylindrical, the released air flowing outwardly through each cylindrical screen element and the conveyed seed following gravitationally through its said cylindrical screen element.

29. A method of depositing a seed at a predetermined location comprising the steps of forming a flowing stream of seeds, providing an electrostatic field so as to electrostatically divert a seed from said stream, directing the diverted seed to said predetermined location, providing an electrostatic field at different times to effect the electrostatic diversion of other seeds contained in said flowing stream, and directing the additionally diverted seeds to other predetermined locations.

30. A method in accordance with claim 29 in which said one seed is diverted from said stream and the diversion of the next additional seed from said stream is delayed until the first seed to be diverted has been directed to its said predetermined location.

31. A method in accordance with claim 30 including the step of removing said electrostatic field to delay the diversion of said next additional seed until said first seed has been directed to its predetermined location.

32. A method in accordance with claim 31 in which said electrostatic field is provided by a high voltage and said high voltage is disconnected to remove said electrostatic field.

33. A method in accordance with claim 32 in which said voltage is increased from a lower voltage insufficient to divert seeds from said stream to a value sufficient to divert seeds from said stream.

34. A method in accordance with claim 33 including the step of providing a moisturized atmosphere for said stream of seeds, said voltage being increased while said stream of seeds is in said moisturized atmosphere.

* * * * *